United States Patent
Pastore et al.

(10) Patent No.: US 12,063,237 B2
(45) Date of Patent: Aug. 13, 2024

(54) METHODS FOR TRACING MALICIOUS ENDPOINTS IN DIRECT COMMUNICATION WITH APPLICATION BACK ENDS USING TLS FINGERPRINTING TECHNIQUES

(71) Applicant: Cleafy Società per Azioni, Milan (IT)

(72) Inventors: Nicolò Pastore, Milan (IT); Carmine Giangregorio, Milan (IT); Andrea Sessa, Milan (IT)

(73) Assignee: Cleafy Società per Azioni, Milan (IT)

( * ) Notice: Subject to any disclaimer, the term of this patent is extended or adjusted under 35 U.S.C. 154(b) by 356 days.

(21) Appl. No.: 17/508,188

(22) Filed: Oct. 22, 2021

(65) Prior Publication Data

US 2022/0131885 A1    Apr. 28, 2022

(51) Int. Cl.
*H04L 9/40*    (2022.01)

(52) U.S. Cl.
CPC ...... *H04L 63/1425* (2013.01); *H04L 63/0236* (2013.01); *H04L 63/1416* (2013.01); *H04L 63/1483* (2013.01); *H04L 63/166* (2013.01)

(58) Field of Classification Search
CPC ............. H04L 63/1425; H04L 63/0236; H04L 63/1416; H04L 63/1483; H04L 63/166
USPC ......................................................... 726/22
See application file for complete search history.

(56) References Cited

U.S. PATENT DOCUMENTS

| | | | |
|---|---|---|---|
| 2012/0210421 A1* | 8/2012 | Ormazabal | H04L 63/1416 726/22 |
| 2018/0054455 A1* | 2/2018 | Bercovich | H04L 63/1441 |
| 2019/0123982 A1* | 4/2019 | Komarek | H04L 41/16 |
| 2019/0190950 A1* | 6/2019 | Senecal | H04L 63/166 |
| 2019/0222588 A1* | 7/2019 | Marzorati | H04L 67/564 |

OTHER PUBLICATIONS

International Search Report and Written Opinion in corresponding Italian Application No. 102020000025168 mailed on Jun. 9, 2021 (11 pages).

(Continued)

*Primary Examiner* — Lynn D Feild
*Assistant Examiner* — Saad Ahmad Abdullah
(74) *Attorney, Agent, or Firm* — MH2 TECHNOLOGY LAW GROUP LLP (57) ABSTRACT

A method for tracing malicious endpoints in communication with a back end may include: providing a reverse proxy to intercept traffic exchanged between a client and the back end; providing a processing unit with an algorithm; intercepting, using the proxy, each TLS Client HELLO directed to the back end and generating a TLS Client HELLO hash using the algorithm; intercepting and processing, using the proxy, each HTTP request to extract a Client User Agent; processing the Client User Agent to generate an Agent hash; processing the HELLO hash and Agent hash by calculating a number of occurrences in which the HELLO hash is associated with the Agent hash to obtain a relative frequency value, to determine whether the HELLO hash is common to or anomalous for the Agent hash of the client; and performing one or more attack protection actions of a Man-in-the-Middle type if the HELLO hash is anomalous.

10 Claims, 3 Drawing Sheets

(56) References Cited

OTHER PUBLICATIONS

Fisher, G. et al. "Monsters in the Middleboxes: Introducing Two New Tools for Detecting HTTPS Interception," The Cloudflare Blog, Mar. 18, 2019 [retrieved on Jun. 9, 2021 from the Internet: <URL:https://blog.cloudflare.com/monsters-in-the-middle-boxes/>], pp. 6-16 (18 pages).

Valenta, L. et al. "Monsters in the Middleboxes Building Tools for Detecting HTTPS Interception," blackhat USA 2019, Las Vegas—USA, Aug. 7, 2019 [retrieved on Jun. 9, 2021 from the Internet: <URL:https://i.blackhat.com/USA-19/Wednesday/us-19-Valenta-Monsters-In-The-Middleboxes-Building-Tools-For-Detecting-HTTPS-Interception.pdf>], slides 1-12 (19 pages).

Valenta, L. "GitHub—cloudflare/mitmengine: A MITM (monster-in-the-middle) detection tool. Used to build MALCOLM:," GitHub, Feb. 7, 2020 [retrieved on Jun. 9, 2021 from the Internet: <URL:https://github.com/cloudflare/mitmengine>], the whole document (7 pages).

\* cited by examiner

▼ TLSv1.2 Record Layer: Handshake Protocol: Client Hello
    Content Type: Handshake (22)
    Version: TLS 1.0 (0x0301)
    Length: 224
  ▼ Handshake Protocol: Client Hello
      Handshake Type: Client Hello (1)
      Length: 220
      Version: TLS 1.2 (0x0303) ◄─────
    ▶ Random
      Session ID Length: 0
      Cipher Suites Length: 38
    ▶ Cipher Suites (19 suites) ◄─────
      Compression Methods Length: 1
    ▶ Compression Methods (1 method)
      Extensions Length: 141 ◄─────
    ▶ Extension: server_name
    ▶ Extension: elliptic_curves ◄─────
    ▶ Extension: ec_point_formats ◄─────
    ▶ Extension: signature_algorithms
    ▶ Extension: next_protocol_negotiation
    ▶ Extension: Application Layer Protocol Negotiation
    ▶ Extension: status_request
    ▶ Extension: signed_certificate_timestamp
    ▶ Extension: Extended Master Secret

```
0060  1a e1 15 00 00 26 00 ff  c0 2c c0 2b c0 24 c0 23   .....&.. .,.+.$.#
0070  c0 0a c0 09 c0 30 c0 2f  c0 28 c0 27 c0 14 c0 13   .....0./ .(.'....
0080  00 9d 00 9c 00 3d 00 3c  00 35 00 2f 01 00 00 8d   .....=.< .5./....
0090  00 00 00 18 00 16 00 00  13 63 6c 69 65 6e 74 73   ........ .clients
00a0  31 2e 67 6f 6f 67 6c 65  2e 63 6f 6d 00 0a 00 08   1.google .com....
00b0  00 06 00 17 00 18 00 19  00 0b 00 02 01 00 00 0d   ........ ........
00c0  00 12 00 10 04 01 02 01  05 01 06 01 04 03 02 03   ........ ........
```

Fig. 5

METHODS FOR TRACING MALICIOUS ENDPOINTS IN DIRECT COMMUNICATION WITH APPLICATION BACK ENDS USING TLS FINGERPRINTING TECHNIQUES

CROSS-REFERENCE TO RELATED APPLICATION(S)

This application claims priority under 35 U.S.C. § 119 from Italian Patent Application No. 102020000025168, filed on Oct. 23, 2020, in the Italian Patent and Trademark Office ("IPTO"), the entire contents of which are incorporated herein by reference.

FIELD OF APPLICATION

The present disclosure relates to a method for tracing malicious endpoints in direct communication with an application back end using Transport Layer Security ("TLS") fingerprinting techniques. In particular, the present invention relates to a method for monitoring and protecting communication with an application back end and which allows to counter attacks of the Man-in-the-Middle type.

DESCRIPTION OF THE TECHNICAL BACKGROUND

The use of antivirus software to counter computer attacks is known in the state of the art, also of the Man-in-the-Browser and/or Man-in-the-Middle and/or Bot Attack type.

Detection methods are further known which are applied on the client computer or directly on the traffic exchanged between the client and the web server associated with a given web application, to identify any attacks of the Man-in-the-Browser and/or Man-in-the-Middle and/or Bot attack types.

The TLS fingerprinting technique is a malware detection technique, applied especially to counter attacks of the Mart-in-the-Middle type. This technique includes obtaining a sort of imprint of the Client HELLO action performed by the client (e.g., web browser) with the back end (e.g., web server) with Secure Sockets Layer ("SSL") or TLS protocol, hence the term "fingerprint". The Client HELLO, with which the client is presented at the back end, is "finger-printable" (i.e., it is possible to obtain a so-called fingerprint of the Client HELLO, the latter being well defined for a given group of clients). Therefore, TLS fingerprinting is a real detection method with which it is possible to obtain a sort of fingerprint of the malware. It is a preliminary screening to widespread detection techniques since the Client HELLO is the first information received from the back end, for example, when the client connects to a website residing on the web server by means of a web browser.

In particular, the TLS protocol, and its SSL predecessor, are used for encrypting the communications of many Hypertext Transfer Protocol ("HTTP") applications. In particular, during the initialization step, a client which wants to establish a Transmission Control Protocol ("TCP") connection towards a web server will send a special packet, called TLS Client HELLO.

This packet and the manner in which it is generated is closely related to the how the client application was built. If the TLS connection is accepted, the web server will respond with a corresponding packet, called TLS Server HELLO, also closely linked to its configuration and the libraries used. Since the negotiations envisaged by the protocol are transmitted "in clear text", a fingerprint can be obtained, and thus the client application can be identified using some of the information contained in the TLS Client HELLO. As mentioned before, this type of fingerprint is known in the literature under the name TLS fingerprinting. Similarly, a server-side fingerprint can be obtained using the information contained within the TLS Server HELLO, in this case the result is known as the TLS/Server-side fingerprint.

Endpoints can be malicious because they are infected with malware and become part of a hornet or because they are used by fraudsters or hackers to conduct cyber attacks and/or fraud.

Typically, an endpoint is reported as malicious downstream of, for example, one or more fraud attempts, evidence of active malware, or anomalous behaviour attributable to known fraud patterns.

Once a malevolent endpoint has been identified, the problem is being able to trace it so as to anticipate the attackers' moves. Such tracing occurs by means of fingerprinting techniques.

The classic fingerprinting techniques require an active component present within the monitored endpoint capable of collecting a sufficient amount of parameters which can be used to obtain the fingerprint itself.

Calculating a TLS fingerprint requires access to and the analysis of information contained within a particular packet, called the TLS Client HELLO, exchanged between the client and web server during the negotiation steps of a TLS connection.

US20180054455A1 discloses an architecture in which the TLS fingerprints are extracted and collected for the purpose of detecting endpoints whose number of malicious transactions associated with the fingerprint itself exceeds a given threshold. Users associated with anomalous fingerprints are then subjected to blacklisting/whitelisting policies.

Instead in document US20190190950A1, the objective of the disclosed method relates to the detection of bots through the collection of TLS fingerprints. Subsequently, based on statistics derived from the fingerprints collected, the endpoints classified as hots are identified and excluded from use of the service.

A method for tracing malicious endpoints in direct communication with an application back end using TLS fingerprinting techniques is described in the document Gabbi Fisher et. al. entitled "Monsters in the middleboxes: introducing two new tools for detecting HTTPS interception", found on the interact on "The Cloudflare Blog" dated 18 Mar. 2019.

Problems of the Background Art

The known systems do not allow to detect and possibly block the action of mal ware or an attacker in an efficient manner.

For example, the method disclosed in US20180054455A1 collects the Client HELLO hash and, if fraud has occurred, marks it as malicious. However, if the Client HELLO is modified by the malware or the attacker, the method would not be able to recognize it as malicious, and an attack of the Man-in-the-Middle type would still occur.

With respect to the methods which use active components, such as JavaScript probes in the web world or Software Development Kits ("SDKs") in the mobile world, such techniques are often invasive and easily identifiable and circumventable by a very determined attacker.

SUMMARY OF THE INVENTION

The object of the invention in question is to obtain a method for tracing malicious endpoints in direct communication with an application back end using TLS fingerprinting techniques which is able to overcome the drawbacks of the prior art.

A further object of the present invention is to obtain a method which allows to continuously identify and trace over time, with a high degree of reliability, the malicious endpoints in direct communication with the application back end.

Advantages of the Invention

By virtue of an embodiment, it is possible to obtain a method which allows to identify and trace over time, with a high degree of reliability, the malicious endpoints in direct communication with the application back end.

By virtue of a further embodiment, it is possible to obtain a TLS fingerprinting method which does not require any active component nor modification of the monitored endpoint, being based on communication parameters which can be extrapolated outside the context of the client. It is not possible for an attacker to detect the presence of such a fingerprint tracing system on the endpoint side. Furthermore, the very nature of the parameters collected makes the fingerprint very reliable and extremely difficult to modify, even by determined attackers provided with suitable technological means.

BRIEF DESCRIPTION OF THE DRAWINGS

The features and advantages of the present invention will become apparent from the following detailed description of a possible practical embodiment thereof, illustrated by way of non-limiting example in the accompanying drawings, in which.

DETAILED DESCRIPTION

The present invention relates to a method for tracing malicious endpoints in direct communication with an application back end using TLS fingerprinting techniques.

Figure 1:
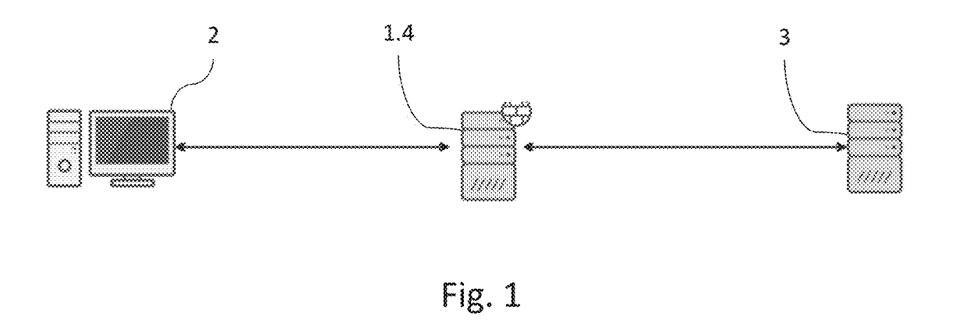
FIGS. 1 and 2 show two variants of a system in which the method of the present invention can be applied.
Figure 2:
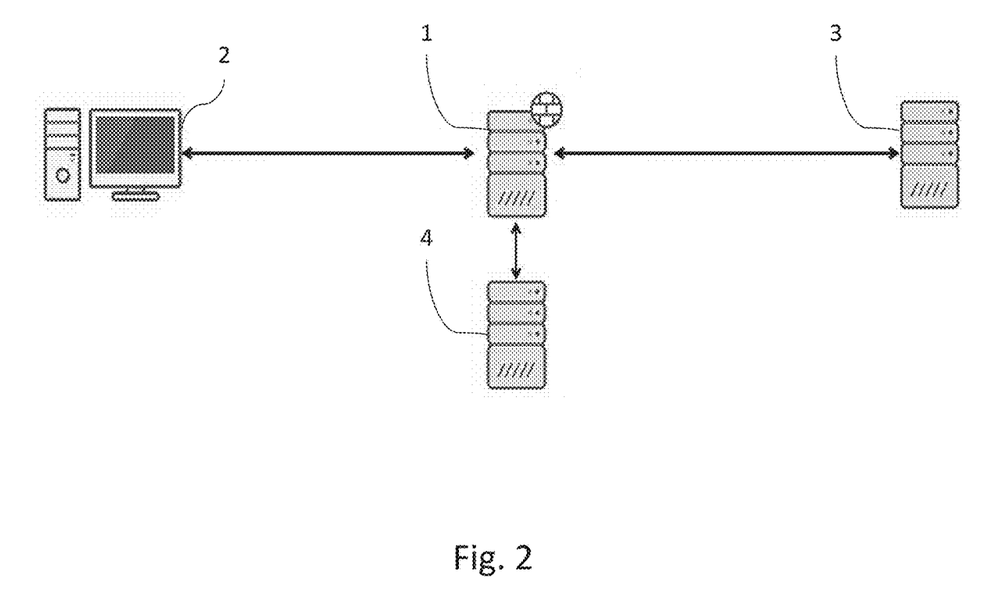

FIGS. 1 and 2 show a typical architecture in which the user, client 2 depicted on the left, initiates a TLS connection towards an application web server 3, depicted on the right. The intermediate component, in the figure indicated as reverse proxy 1, depicts the point at which the TLS connection terminates and therefore the ideal point at which to collect the information necessary for calculating the fingerprint.

The method comprises the step of providing a reverse proxy 1 configured to intercept the traffic exchanged between a client 2 and an application back end residing in a web server 3.

Within the scope of the present invention, client 2 means, for example, a web browser residing in a client device, a mobile application, an Application Programming Interface ("API") call, an Internet of Things ("IoT") device, and in general any known tool adapted to generate and consume HTTP requests. Client device 2 means a device for internet browsing placed in signal communication with the web server 3. The client device 2 is capable of sending requests to the web server 3 and receiving responses through an internet network. The client device 2 may be a tablet, a laptop computer, a desktop computer, a smart television ("TV"), a smartwatch, a smartphone, or any other device capable of processing, communicating with a web server 3, and displaying content obtained from the web server 3, or content already present within the client device 2. The content could be viewed from a browser or other types of software. Such content could be in HyperText Markup Language ("HTML"), JavaScript, or other similar formats of a known type. Furthermore, the client device 2 could contain known operating systems such as Android, IOS, or Microsoft Windows.

The method further comprises the step of providing a processing unit 4 in which a default algorithm resides. A default algorithm is a specially implemented algorithm, used in the execution of specific steps of the method of the present invention, as will be evident below. The processing unit 4 is placed in signal communication with the reverse proxy 1 (FIGS. 1 and 2). Preferably the processing unit 4, shown in FIG. 1, is integrated in the reverse proxy 1. Alternatively, the processing unit 4, shown in FIG. 2, is external to the traffic intercepted by the reverse proxy 1.

The method comprises the step of intercepting 101, by means of the reverse proxy 1, each TLS Client HELLO directed to the application back end and generating 102 a TLS Client HELLO hash by means of the default algorithm. Advantageously, such a reverse proxy 1 represents the ideal point in which to insert the calculation logic for TLS fingerprinting. Such architecture is able to analyze and separate the individual packets exchanged during the initialization step through the TLS protocol.

Figure 3:
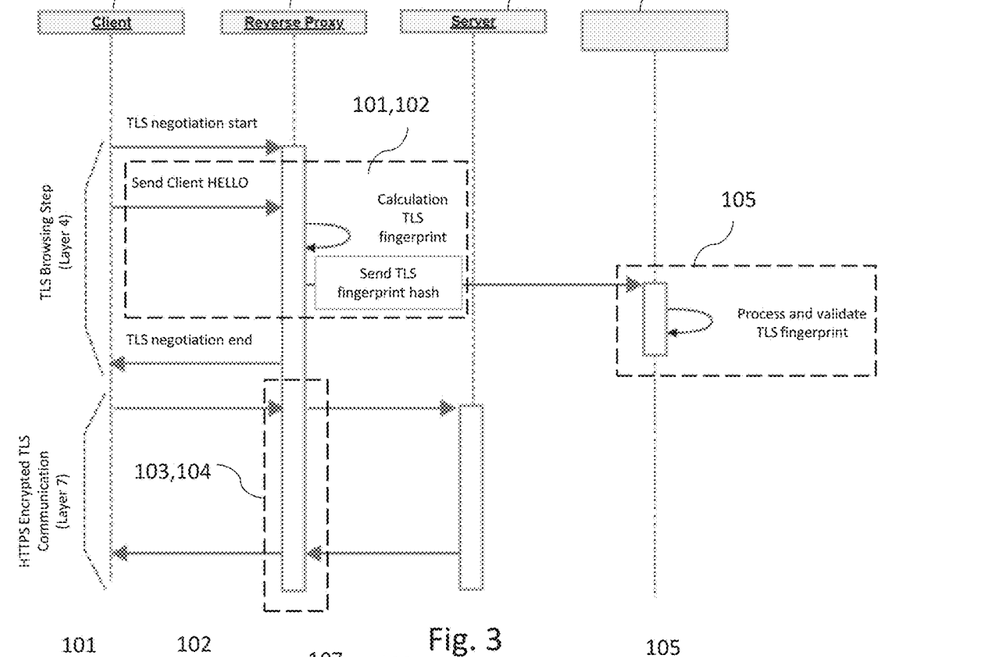
FIG. 3 shows a schematic representation of some steps of the method of the present invention.

The diagram shown in FIG. 3 shows the integration mode. In the initial TLS negotiation step, the client 2 and reverse proxy 1, which is assumed as the point where the TLS termination occurs, exchange the information necessary to establish the TLS connection, including the TLS Client HELLO, which is analysed by the software integrated on the reverse proxy 1 (sniffer).

The method comprises the further step of intercepting and processing 103, by means of the reverse proxy 1, each HTTP request generated by the client 2 and directed to the application back end to extract the Client User Agent from the intercepted HTTP request. Each HTTP request produced by the client 2 must necessarily be processed by the reverse proxy 1 before reaching the application back end.

The method comprises the step of processing 104 the Client User Agent by means of the default algorithm to generate a Client User Agent hash.

The method comprises the step of processing 105, by means of the default algorithm, the TLS Client HELLO hash and the Client User Agent hash to determine whether the TLS Client HELLO hash is common to or anomalous for the Client User Agent hash of the client 2. Specifically, the TLS Client HELLO hash is to be considered common to the Client User Agent hash of the client 2 if such TLS Client HELLO hash is frequently associated with the Client User Agent hash of the specific client 2. Vice versa, the TLS Client HELLO hash is to be considered anomalous for the Client User Agent hash of the client 2 if such TLS Client HELLO hash has been rarely or never associated with the Client User Agent hash of the specific client 2.

Figure 4:
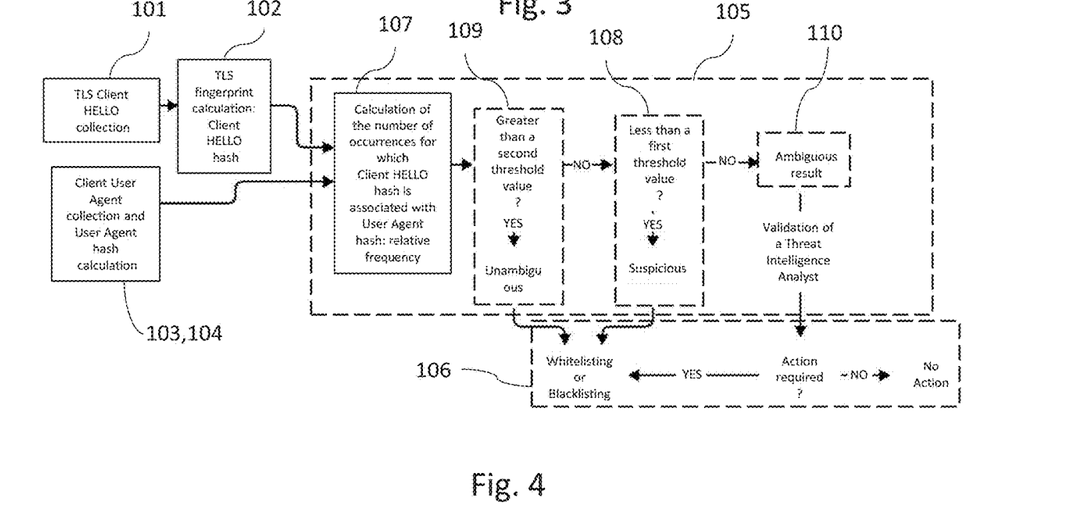
FIG. 4 shows a flow chart of a sequence of steps of the method of the present invention.

An exemplary implementation of the method is depicted in FIGS. 3 and 4, in which each HTTP request is processed by the reverse proxy 1, its fingerprint calculated and then sent to the processing unit 4, i.e., to an external structure capable of collecting and processing such data safely.

The method also comprises the step of performing 106 one or more attack protection actions of the Man-in-the-Middle type if the TES Client HELLO hash is anomalous for the Client User Agent hash of the client 2.

In accordance with a preferred embodiment of the invention, the step of processing 105, by means of the default algorithm, the TLS Client HELLO hash and the Client User Agent hash comprises the step of associating, by means of the default algorithm, the TLS Client HELLO hash with the Client User Agent hash of the client 2 and storing said association in a database associated with the processing unit 4 if the default algorithm determines that the TLS Client HELLO hash is common to the Client User Agent hash of the client 2.

Preferably, the step of storing such association in a database associated with the processing unit 4, if the default algorithm determines that the TLS Client HELLO hash is common to the Client User Agent hash of the client 2, comprises the sub-step of whitelisting each common TLS Client HELLO association for the Client User Agent hash.

The step of processing 105, by means of the default algorithm, the TLS Client HELLO hash and the Client User Agent hash comprises the sub-step of calculating 107 the number of occurrences in which the TLS Client HELLO hash is associated with the Client User Agent hash to obtain a relative frequency value, such relative frequency value being used by the default algorithm to determine whether the TLS Client HELLO hash is common to or anomalous for the Client User Agent hash of the client 2. By way of example, the TLS Client HELLO hash is to be considered common to the Client User Agent hash of the client 2 if the relative frequency value is greater than a given threshold value. Vice versa, the TLS Client HELLO hash is to be considered anomalous for the Client User Agent hash of the client 2 if the relative frequency value is less than such given threshold value.

According to the preferred embodiment of the invention, the step of processing 105, by means of the default algorithm, the TLS Client HELLO hash and the Client User Agent hash comprises the sub-step of determining 108 that the TLS Client HELLO hash is anomalous for the Client User Agent hash of the client 2 when the relative frequency value is less than a first threshold value.

Still preferably, the step of processing 105, by means of the default algorithm the TLS Client HELLO hash and the Client User Agent hash comprises the sub-step of determining 109 that the TLS Client HELLO hash is common to the Client User Agent hash of the client 2 when the relative frequency value is greater than a second threshold value.

Still preferably, the second threshold value is greater than the first threshold value.

More preferably, the step of processing 105, by means of the default algorithm the TLS Client HELLO hash and the Client User Agent hash comprises the step of determining 110 that the TLS Client HELLO hash is suspect for the Client User Agent hash of the client 2 when the relative frequency value is between the first threshold value and the second threshold value. Furthermore, the step of performing 106 one or more attack protection actions of the Man-in-the-Middle type if the TLS Client HELLO hash is anomalous for the Client User Agent hash of the client 2, comprises the sub-step of performing one or more detection actions for Man-in-the-Middle type attacks if the TLS Client HELLO hash is suspicious for the Client User Agent hash of the client 2.

Preferably, the step of performing 105 one or more attack protection actions of the Man-in-the-Middle type if the TLS Client HELLO hash of the client 2 is anomalous for the Client User Agent hash of the client, comprises the sub-step of placing in a blacklist related to malicious endpoints each anomalous association of the TLS Client HELLO hash for the Client User Agent hash.

More preferably, the step of performing 105 one or more attack protection actions of the Man-in-the-Middle type if the TLS Client HELLO hash is anomalous for the Client User Agent hash of the client 2 comprises the sub-step of blocking the communication of the client 2 with the application back end when a TLS Client HELLO hash present in the blacklist is detected. In other words, the method includes performing blocking security actions when the TLS Client HELLO hash is anomalous for the Client User Agent hash.

Still preferably, the step of performing 105 one or more Man-in-the-Middle type attack protection actions if the TLS Client HELLO hash is anomalous for the Client User Agent hash of the client 2, comprises one or more of the following sub-steps: i) sending a compromise signal to the application back end; ii) actuating an additional authentication system of the Strong Customer Authentication ("SCA") or Multi-Factor Authentication ("MFA") type, such as Short Message Service ("SMS"), notifications, email, telephone, sending a notification to a security and/or anti-fraud platform, sending a compromise signal on an external channel or a channel integrated with a security analysis platform. In other words, as an alternative to or in combination with the aforementioned blocking actions, the method includes performing non-blocking security actions when the TLS Client HELLO hash is anomalous for the Client User Agent hash.

According to a preferred embodiment of the invention, the step of providing a processing unit 4 in which a default algorithm resides includes providing a default algorithm which employs artificial intelligence techniques.

An exemplary embodiment of some steps of the method of the present invention is described below, in accordance with the diagram shown in FIG. 4 and with particular focus on steps 105 and 106.

The analysis algorithm receives the TLS Client HELLO and Client User Agent hashes as input, and then calculates the number of occurrences in which the TLS Client HELLO hash is associated with the Client User Agent hash, obtaining a relative frequency value (step 107).

If the threshold value is greater than the upper threshold, i.e., the second threshold value, the TLS client HELLO hash would be recognized as non-anomalous because statistically it would often be associated with the Client User Agent hash (step 109).

If the threshold value is less than the lower threshold, i.e., the first threshold value, the TLS client HELLO hash would be recognized as anomalous because it is not statistically associated with the specific TLS fingerprint hash (step 108).

Instead, if the threshold value is between the first and the second threshold value, there would be an ambiguous situation which should be carefully evaluated, for example, by a Threat Intelligence Analyst (step 110).

In all the cases listed above, the result of the analysis would converge towards the application of appropriate blacklisting/whitelisting policies so that subsequent occurrences of the TLS Client HELLO hash and Client User Agent hash pair can be appropriately recognized (step 106).

Advantageously, the default algorithm effectively obtains an outlier detector which allows to extend the capabilities of the known detection methods, which employ, for example, Document Object Model ("DOM") integrity algorithms, which can be used in combination with the method of the present invention. Often, in fact, the modification of information by a malware or hacker, such as an International Bank Account Number ("IBAN") used during a transaction, can occur without a real injection of code within the application page being monitored, thus being invisible to the DOM integrity algorithm. However, the method of the present invention does not base its analysis on the presence of code injection, and is therefore able to detect any change to the layer 4 within the HTTP client used by the client 2, exposing any Man-in-the-Middle within the HTTP communication.

With reference to the method disclosed in document U.S. Pat. No. 20180054455A1, it should be noted that it envisages collecting the TLS Client HELLO hash and, if fraud is detected, marking such TLS Client HELLO hash as malicious. However, the user agent has a family of TLS Client HELLO hashes associated therewith. Thus, it is possible that in the TLS Client HELLO hash family for a User Agent there is only one malicious hash which, being changed, would not be recognized as malicious by the method described in US20180054455A1 until after a fraud has occurred.

An example of TLS Client HELLO processing is disclosed below.

Figure 5:
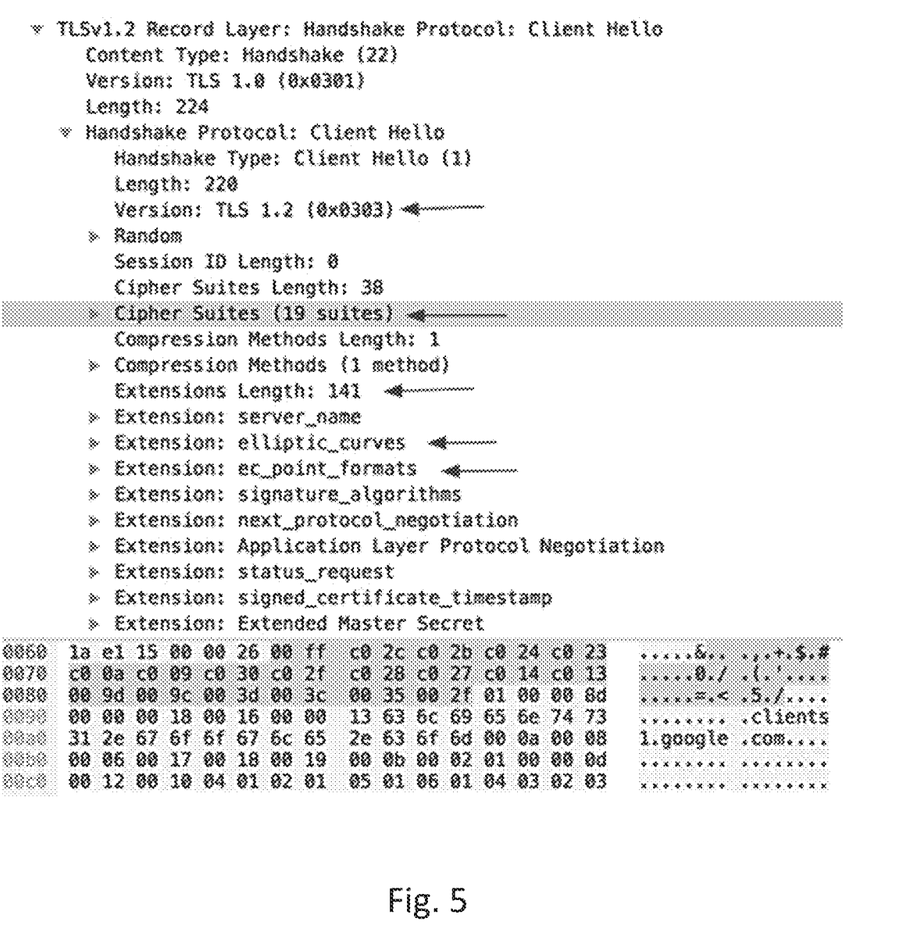
FIG. 5 shows an example of a TLS client HELLO data packet.

An example of the content of a TLS Client HELLO packet is shown in FIG. 5. The data highlighted by the arrows represent the data used in the present method in the calculation of the TLS fingerprint.

Each of these values is converted to its decimal representation and concatenated using ",", to delimit each field and "-" to delimit each value within a single field.

The following is an example of a TLS Client HELLO hash:
   769,47-53-5-10-49161-49162-49171-49172-50-56-19-4,0-10-11,23-24-25,0

The string thus obtained is processed through a hashing algorithm, for example, Message Digest Algorithm ("MD5"), producing a corresponding 32- character string which constitutes the TLS fingerprint.

For example, applying the MD5 hashing algorithm to the previous string would result in the following fingerprint:
   Ada70206e40642a3e4461f35503241d5

As for the Client User Agent hash, the latter is for example the hash of the value of the User Agent obtained by means of the MD5 algorithm. For example, it may be the hash of the entire User Agent value as sent by the web browser of the client 2 (i.e., a string generated by the web browser and sent to the web server 3 via HTTP Header). Alternatively, it may be a simplification of the latter, for example consisting of the web browser type and version (e.g., "firefox 68").

With reference to FIGS. 3 and 4, an application example of the method of the present invention is disclosed below.

Initially, the client 2 establishes an encrypted channel with TLS or SSL servers (i.e., TCP or hash layer 4).

The TLS Client HELLO is mapped, which defines which encryption techniques are supported by the client 2, and is unique for the client 2.

With the sniffer, or reverse proxy 1, the TLS Client HELLO destined for the application back end is intercepted (step 101) and is subjected to the processing unit 4, which obtains the hash of the Information Technology ("IT") content of the TLS Client HELLO (i.e., a fingerprint (step 102)).

The client 2 establishes an encrypted communication channel, and it is the first action it performs connecting to the web server 3 of the application back end. The client 2 then establishes an SSL or TLS encrypted channel with the web server 3 (layer 4), and sends a TLS Client HELLO which is a message defining which encryption techniques are supported by the client 2, e.g.: supported elliptical curves, encryption techniques, asymmetric type algorithm to be able to exchange the key, symmetric algorithm to perform the encryption. The TLS Client HELLO is unique for that type of client 2, thus it is possible to uniquely identify a certain family of clients 2, such as a specific web browser.

Therefore, the request of the client 2 goes towards the web server 3 and establishes an SSL communication channel.

The HTTP request (layer 7) of the client 2 is sent which contains the User Agent and a string, automatically generated by the client 2, which defines the web browser (for example, the version of the web browser) and operating system.

Also in this case, the reverse proxy 1 intercepts the HTTP request and extracts the Client User Agent (step 103), sends it to the processing unit 4 which builds the Client User Agent hash which defines the specific user agent string (step 104).

It should be noted that step 105 of anomaly detection allows comparing the Client User Agent hash, which defines the client 2 which has established the HTTP communication (layer 7), with the TLS Client HELLO hash, indicative of how the TCP type communication has been established (layer 4).

Then in step 105 of anomaly detection, the two hashes of the Client HELLO and the User Agent string are analyzed, attributing the User Agent ("UA") hash to the Client HELLO hash, performing an analysis of the occurrences and counting how many times the User Agent had the Client HELLO hash, calculating a relative frequency value (step 107). If such a value is greater than an upper threshold, for example 80% (second threshold value), then it is common to the User Agent in question. In this case, in fact, no anomaly is detected because the relative frequency value is greater than the threshold value, and therefore the client HELLO hash is common to the user agent. If the relative frequency value is instead less than a lower threshold value, such as 10% (the first threshold value), the Client HELLO hash is rare/not common to the user agent. Therefore, the Client HELLO hash is recognized as suspicious and is then analyzed in detail to verify whether the Client HELLO (hash) is typical for the user agent of the client 2 (i.e., whether the request actually comes from the client or not) and, in the latter case, an actual risk is recognized. Therefore, in the event of actual risk, the method includes proceeding with step 106, taking one or more mitigation countermeasures, such as user block, further authentication, notification to the client 2 of possible threat, blacklisting of the suspicious hash, for example, if the hash is attributable to malware or another malicious object. Therefore, it passes from a suspicious situation to a situation of actual risk and each time a client 2 will exchange information with that Client HELLO hash, it will automatically be blacklisted.

Advantageously, the method of the present invention allows to understand whether, once the SSL interaction is initiated, the Client HELLO hash differs from that expected if there is malware or an attacker which is acting in the middle of the communication/traffic (Man-in-the-Middle). The Man-in-the-Middle wants to see and modify the content by tampering a communication to be able to see the HTTP content of the layer 7, breaking the encrypted communication between the client 2 and reverse proxy (layer 4), which in turn breaks the communication with the web server 3 of the application back end.

The client 2 establishes an SSL communication, but the Client HELLO is intercepted by the Man-in-the-Middle, and an SSL communication is established between client 2 and Man-in-the-Middle. The latter sends its own Client HELLO to the application back end, and not that of the client 2. However, the reverse proxy 1 intercepts the client HELLO generated by the Man-in-the-Middle.

However, the User Agent is the same as the client 2 which is undergoing the attack, which must still launch its HTTP communication with the web server 3 so that the Man-in-the-Middle can tamper with the content exchanged in the encrypted HTTP protocol.

Advantageously, by comparing the Client HELLO hash and the User Agent hash, it is possible to verify whether the Client HELLO hash is not known for that user agent, and therefore whether it is suspicious since the relative frequency value is below the lower threshold value (first threshold value). Therefore, it is possible to take countermeasures, identifying any anomalies for this client 2. For example, the Client HELLO hash can be entered in a blacklist to automatically block it whenever it is intercepted.

It should be noted that, in order for such a method to be particularly effective, the reverse proxy 1 should have intercepted at least once, in an initial learning step, the client 2 and its Client HELLO without the Man-in-the-Middle. It should be noted that the default algorithm can employ artificial intelligence techniques, so that over time it can learn if there are multiple known Client HELLO hashes for a specific client 2. Such a learning step includes monitoring the traffic of HTTP requests exchanged between client 2 and application back end, and not on the actions or information content of the communications. In fact, the objective of the present method is to be able to verify whether a particular HTTP call comes from a correct or incorrect client 2 as it was presented (HELLO).

However, the fact that a Client HELLO does not match the HTTP request is not an exact indicator of the presence of a Man-in-the-Middle. In fact, it could be a Web secure gateway of the enterprise type present in the network, a proxy gate in the company network. Therefore, the analysis performed in the present method allows to identify the presence of a proxy placed in front of the client 2 which generates the request. Advantageously, if the default algorithm identifies the presence of a proxy and determines that it is a non-malicious element such an element can be inserted in a whitelist because the intercepted Client HELLO is not that of the client 2, but that of the secure gateway which differs from the typical Client HELLOs for the user agent of the client 2. Therefore, in the learning step, the client HELLO of the proxy is attributed to that specific user agent of the client 2 because, even if it was not common, it was entered in the whitelist as it was associated with the secure proxy.

Advantageously, if the Client HELLO hash is identified as suspicious, and the default algorithm employing artificial intelligence detects that a number of frauds have occurred when the specific Client HELLO hash has been identified, then that hash is automatically entered in the blacklist.

The invention claimed is:

1. A method for tracing malicious endpoints in direct communication with an application back end using Transport Layer Security (TLS) fingerprinting techniques, the method comprising:
    providing a reverse proxy configured to intercept traffic exchanged between a client and the application back end;
    providing a processing unit in which a default algorithm resides and placing the processing unit in signal communication with the reverse proxy;
    intercepting, using the reverse proxy, each TLS Client HELLO directed to the application back end and generating a TLS Client HELLO hash using the default algorithm;
    intercepting and processing, using the reverse proxy, each Hypertext Transfer Protocol (HTTP) request generated by the client and directed to the application back end in order to extract a Client User Agent from the intercepted HTTP request;
    processing the extracted Client User Agent, using the default algorithm, in order to generate a Client User Agent hash;
    processing, using the default algorithm, the TLS Client HELLO hash and the Client User Agent hash by calculating a number of occurrences in which the TLS Client HELLO hash is associated with the Client User Agent hash in order to obtain a relative frequency value, wherein the relative frequency value is used by the default algorithm to determine whether the TLS Client HELLO hash is common to or anomalous for the Client User Agent hash of the client; and
    performing one or more attack protection actions of a Man-in-the-Middle type if the TLS Client HELLO hash is anomalous for the Client User Agent hash of the client.

2. The method of claim 1, wherein the processing of the TLS Client HELLO hash and the Client User Agent hash using the default algorithm comprises:
    associating the TLS Client HELLO hash with the Client User Agent hash of the client using the default algorithm and storing such association in a database associated with the processing unit if the default algorithm determines that the TLS Client HELLO hash is common to the Client User Agent hash of the client.

3. The method of claim 2, wherein the storing of such association in the database associated with the processing unit if the default algorithm determines that the TLS Client HELLO hash is common to the Client User Agent hash of the client comprises:
    inserting in a whitelist each common association of the TLS Client HELLO hash for the Client User Agent hash of the client.

4. The method of claim 1, wherein the processing of the TLS Client HELLO hash and the Client User Agent hash using the default algorithm comprises:
    determining that the TLS Client HELLO hash is anomalous for the Client User Agent hash of the client when the relative frequency value is less than a first threshold value.

5. The method of claim 4, wherein the processing of the TLS Client HELLO hash and the Client User Agent hash using the default algorithm further comprises:
    determining that the TLS Client HELLO hash is common to the Client User Agent hash of the client when the relative frequency value is greater than a second threshold value that is greater than the first threshold value.

6. The method of claim 5, wherein the processing of the TLS Client HELLO hash and the Client User Agent hash using the default algorithm further comprises:
    determining that the TLS Client HELLO hash is suspicious for the Client User Agent hash of the client when the relative frequency value is greater than or equal to the first threshold value and less than or equal to the second threshold value; and
    wherein the performing of the one or more attack protection actions of the Man-in-the-Middle type if the TLS Client HELLO hash is anomalous for the Client User Agent hash of the client comprises:
performing one or more detection actions for Man-in-the-Middle attacks if the TLS Client HELLO hash is suspicious for the Client User Agent hash of the client.

7. The method of claim 1, wherein the performing of the one or more attack protection actions of the Man-in-the-Middle type if the TLS Client HELLO hash is anomalous for the Client User Agent hash of the client comprises:
inserting into a malicious endpoint blacklist each abnormal association of the TLS Client HELLO hash for the Client User Agent hash of the client.

8. The method of claim 7, wherein the performing of the one or more attack protection actions of the Man-in-the-Middle type if the TLS Client HELLO hash is anomalous for the Client User Agent hash of the client further comprises:
blocking communication of the client with the application back end when the TLS Client HELLO hash in the malicious endpoint blacklist is detected.

9. The method of claim 1, wherein the performing of the one or more attack protection actions of the Man-in-the-Middle type if the TLS Client HELLO hash is anomalous for the Client User Agent hash of the client further comprises one or more of:
sending a compromise signal to the application back end;
actuating an additional authentication system of a Strong Customer Authentication (SCA) type or a Multi-Factor Authentication (MFA) type;
sending a notification to a security, anti-fraud, or security and anti-fraud platform; and
sending a compromise signal to an external channel or a channel integrated with a security analysis platform.

10. The method of claim 1, wherein the providing of the processing unit in which the default algorithm resides comprises providing the default algorithm which employs artificial intelligence (AI) techniques.

* * * * *

UNITED STATES PATENT AND TRADEMARK OFFICE
CERTIFICATE OF CORRECTION

| | |
|---|---|
| PATENT NO. | : 12,063,237 B2 |
| APPLICATION NO. | : 17/508188 |
| DATED | : August 13, 2024 |
| INVENTOR(S) | : Nicolò Pastore, Carmine Giangregorio and Andrea Sessa |

It is certified that error appears in the above-identified patent and that said Letters Patent is hereby corrected as shown below:

On the Title Page

Add item (30) between items (65) and (51):
--(30) Foreign Application Priority Data
Oct. 23, 2020 (IT) .................. 102020000025168--

Signed and Sealed this
Twenty-first Day of October, 2025

John A. Squires
*Director of the United States Patent and Trademark Office*